United States Patent [19]

Stevens

[11] 3,780,257
[45] Dec. 18, 1973

[54] ARC WELDING TORCHES FOR TUBE PLATE WELDING

[75] Inventor: Kenneth Stevens, Richmond, England

[73] Assignee: Foster Wheeler John Brown Boilers Ltd., London, England

[22] Filed: Sept. 1, 1972

[21] Appl. No.: 285,842

[52] U.S. Cl. ............................................ 219/125 R
[51] Int. Cl. .............................................. B23k 9/12
[58] Field of Search ..................... 219/125 R, 60 A, 219/130, 136, 145

[56] References Cited
UNITED STATES PATENTS

| 3,493,716 | 2/1970 | Martin | 219/125 R |
| 3,189,723 | 6/1965 | Adamson | 219/130 |
| 3,253,116 | 5/1966 | Kensrue | 219/130 |

Primary Examiner—R. F. Staubly
Assistant Examiner—L. A. Schutzman
Attorney—Arthur E. Dowell, Jr. et al.

[57] ABSTRACT

The torch described herein is for making internal bore welds. It has a stem carrying a non-consumable electrode and a body from which the stem projects. To make a weld, the stem is inserted into a bore so that the electrode is positioned near the join to be welded and the electrode is orbited around the join while an arc is maintained to make the weld. The stem has a core of high heat conductivity which is in contact with both the electrode and a heat sink block in the torch body. Provision is also made for the passage of inert shielding gas from the body and along the stem to the region of the electrode, this core and/or block having an extended surface area over which the inert shielding gas is arranged to pass so as to assist in cooling these and consequently the electrode.

8 Claims, 2 Drawing Figures

PATENTED DEC 18 1973

3,780,257

ARC WELDING TORCHES FOR TUBE PLATE WELDING

This invention relates to arc welding torches and is concerned with arc welding torches of the interal bore non-consumable electrode type.

BACKGROUND TO THE INVENTION

The torch described in United Kingdom Pat. No. 934,485 has been immensely successful in welding relatively small bore tubes to tube plates or headers by means of welds effected from within the bore. However, the use of water cooling, while ensuring that the electrode is kept cool, is on occasions liable to lead to less than perfect welds if traces of moisture reach the weld region. This can occur if the water cooling results in condensation on two parts of the stem of the torch. Also there are practical limits on the smallest size of bore which can be welded.

The invention has, therefore, been made with these points in mind.

BRIEF DESCRIPTION OF THE INVENTION

According to the invention there is provided an internal bore non-consumable electrode arc welding torch which has an electrode stem projecting from a torch body and carrying a non-consumable electrode, in use the stem being arranged to be inserted into a bore so that the electrode is positioned near to the join to be welded and can be orbited around the join to complete a weld during a welding operation, in which the stem has a passage for the supply of an inert shielding gas to the region of the electrode, and the stem has a core of high heat conductivity in contact both with the electrode and a heat sink block in the torch body, the heat sink block and/or core having an extended surface area and the inert shielding gas being arranged to pass over the extended surface of the block and/or core.

Such a torch can be used to weld very small bore tubes without overheating of the electrode since the stem can be of a very simple construction and the miniumum size of tube which can be welded is determined by the ability of the core to conduct the excess heat away from the electrode to the heat sink block. Provided this core is of a terial such as copper material it can be quite small in cross-sectional area and still conduct large amounts of heat and also the cooling of the core and/or heat sink block further assists in the removal of excess heat from the electrode.

Because the electrode is kept reasonably cool without the need for water cooling, one can achieve excellent welds with less chance of imperfect welds caused by the presence of minute amounts of condensed water.

The heat sink block can be given an extended surface by being given fins or by having its surface grooved and the inert shielding gas can pass over the resulting fins. Also passages may be provided in the block and the inert shielding gas can pass through these to assist in cooling the block. Because the block can be kept relatively cool by the shielding gas it can be quite small and provided it has sufficient heat exchange area with the inert shielding gas to keep it cool it can even be of smaller mass than the core since heat will readily be absorbed by it from the core if it is cool.

The core can be given its extended surface by providing it with splines along its length or by providing it with small fins.

Preferably the block is made of metal, such as copper, because of the ability to absorb heat and preferably the core of high heat conductivity is also made of copper because of its high heat conductivity.

DESCRIPTION OF THE PREFERRED EMBODIMENT

Figures 1, 2:
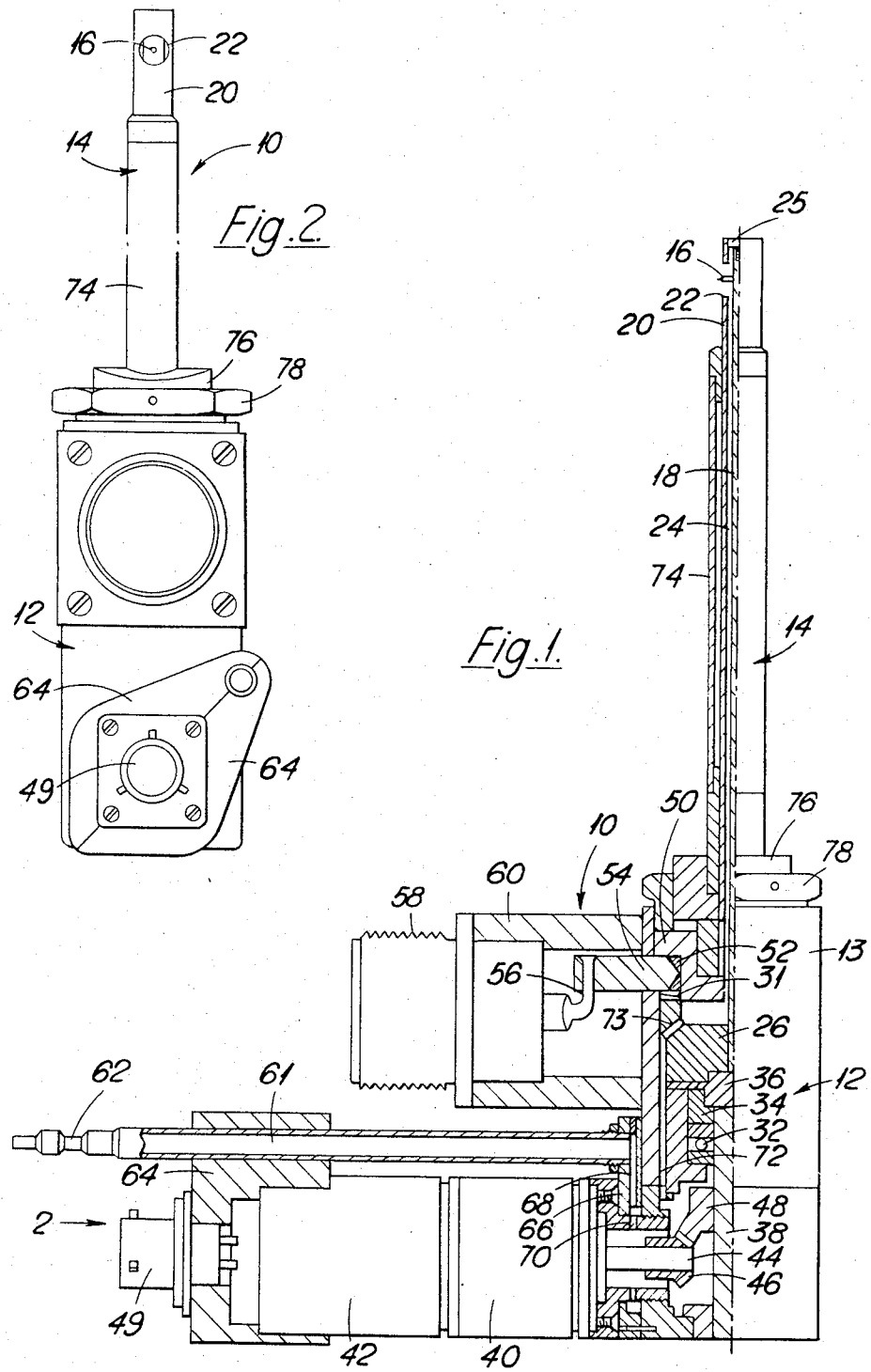
FIG. 1 is an elevation, partly in section, of an electric arc welding torch according to the invention.
FIG. 2 is a side elevation looking in the direction of the arrow 2 of FIG. 1.

The electric arc welding torch 10 shown in the drawings comprises a stationary body 12 including a cylindrical upper part 13 of electrically insulating material, from which extends a stem 14. Situated near the outer end of this stem 14 is a non-consumable tungsten electrode 16.

The stem comprises a core 18 of copper or other material of high heat conductivity. The electrode 16 is fixed in this core near its end. Surrounding this core 18 is a ceramic insulating sleeve 20 in the wall of which is a small hole 22 through which the tip of the electrode projects. Between the ceramic sleeve 20 and the core 18 is an annular passage 24 and inert shielding gas is arranged to pass through this passage to the region of the electrode to shield the weld region during the making of a weld. The outer end of the passage 24 is sealed by the head of a screw 25 threaded into the core.

The other end of the core 18 is screwed into a copper heat sink block 26. As can be seen this has annular fins 28 and a number of longitudinal passages 30 are provided through these fins 28 for the passage of the shielding gas.

The block 26 is rotatably journalled in the body 12 by means of an upper needle roller bearing 31 and a lower ball bearing race 32. Between the race 32 and the block 26 is an annular bearing pad 34 of insulating material. A small plug 36 also of insulating material is disposed between the block 26 and a torque shaft 38 through which rotation is transmitted to the block 26 for rotating the core 18 and sleeve 20 during the making of a weld.

Attached to the lower part of the body 12 is a gear box 40 to which in turn is connected an electric motor 42. The output drive shaft 44 from the gear box 40 has a bevel gear 46 meshing with a bevel gear 48 fixed on the torque shaft 38. In this way, drive from the motor 42 is transmitted to the block 26 and core 18 so as to orbit the electrode 16 around the weld region during the making of a weld. Power is supplied to the motor through an electric inlet socket 49.

As noted above the block 26 is journalled by an upper needle roller bearing 31. This bearing is carried by a support ring 50 of insulating material.

This support ring also has fitted in an annular recess in it an electrically conductive ring 52 in electrical contact with the bearing 31. Also in elecrical contact with the ring 52 is an electrical connector 54 which in turn is connected to the core 56 of an electric plug 58 fitted in a housing 60 attached to the side of the body 12. The electric arc welding current is supplied by a suitable cable (not shown) attached to the plug 58 and current passes to the electrode 16 by way of the core 56, the connector 54, the ring 52, the bearing 31, the block 26 and the core 18.

Inert shielding gas is supplied to the torch through a pipe 61 having an inlet terminal 62 to which a supply tube (not shown) can be connected. The pipe 61 is supported near its inlet end by a pair of half clamps 64 which clamp over the motor 42. The other end of the pipe 61 is screwed into a manifold 66 which defines with the body 12 a gas passage 68. This passage leads from the pipe 60 to within the body 12 through small holes 70. The inert shielding gas supplied to within the body 12 passes up through another bore 72 from whence it flows over the fins 28 around the heat sink block 26 and through the passages 30 and so keeps cool the block during welding. After this, the gas passes up between the ceramic sleeve 20 and core 18 to the region of the weld to blanket the weld region in the usual way.

The pipe 61 also serves to hold the motor 42 and gear box 40 locked to one another and to the body 12. Surrounding all but the outer end of the ceramic sleeve is a metal locating tube 74. This is arranged to fit snugly within a tube to be welded so as to locate the stem 14 accurately in relation to the axis of the tube.

The tube 74 is held in place by means of a datum block 76. This fits in a threaded adjustor 78 which is screwed into the body 12. The block 76 is arranged to abut the end of a tube during welding and it is capable of being adjusted by threading the adjustor 78 into or out of the body so as to adjust the spacing between the electrode and the block. In this way, the position of the electrode tip can be accurately adjusted in relation to the join to be welded.

The operation of the torch should be clear from the above description. When a weld is to be made, the stem 14 is inserted into a tube to be welded. Argon shielding gas is supplied to the pipe 61 from whence it passes over the heat sink block 26 to cool this on its way to weld region. A welding arc is struck by supplying welding current to the plug 58 and irrespective of rotation of the core 18 it passes to the electrode through the bearing 31. Once the arc has been struck the motor 42 is energised and this rotates the core 18 and sleeve 20 and orbits the tip of the electrode around the weld.

The torch 10 according to the invention has the advantages that it can be small and compact and in particular the stem 14 can be of relatively small diameter and so be used to weld tubes or the like having very small internal bores. The electrode is, however, kept cool by the conduction of heat away from it by the core 18 to the heat sink block 26. In turn both the core 18 and block 26 are cooled by the inert argon shielding gas and so this gives excellent heat removal from the electrode and means that the block 26 can be relatively small while still ensuring good cooling of the electrode. Because the motor 42 and gear box 40 are directly linked by gearing to rotate the stem 14, the rotation of the stem does not suffer from an erratic movement due to friction in a long cable connecting the torch to a motor. Therefore this leads to better welds.

Also, the welding current passes to the core 18 from the plug 58 through the bearing 31 and thus gives constant resistance irrespective of the rotaion of the core 18. This allows one to provide a constant weld current which leads to better welds.

Although the torch 10 is shown with the inert shielding gas supplied by the pipe 61, this could be varied by providing a gas inlet through the socket 49 providing power for the motor 42. Theh shielding gas could be supplied through a sheath fitted over the electrical lead. Passages would then be provided to conduct the shielding gas from the socket 49 to within the lower end of the body 12 from whence it would pass as before up over the heat sink block 26 to the weld region. The pipe 61 would also need to be replaced by a solid rod or plugged tubes to hold the motor 42 and gear box 40 locked to one another and to the torch body 12.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. An internal bore non-consumable electrode arc welding torch comprising:
    a. a hollow stem capable of projecting into a tube to be welded.
    b. a core of high heat conductivity material positioned within said hollow stem,
    c. a passage for shielding gas defined between said hollow stem and said core,
    d. a non-consumable electrode carried by said core in heat and electrically conductive relationship with said core,
    e. a port in said stem through which said electrodes projects and through which shielding gas can pass from said passage to shield the weld region during a welding operation,
    f. a heat-sink block in heat conductive relationship with said core whereby said electrode is prevented from overheating during a welding operation by conduction of heat from said electrode to said heat-sink block via said core,
    g. a hollow torch body within which said block is positioned, said passage being in communication with the interior of said body,
    h. means carried by said body for rotatably supporting said block and stem,
    i. means for rotating said block and stem relative said body to orbit said electrode around a joint to be welded,
    j. means for supplying welded current to said core,
    k. inlet means for supplying inert shielding gas to within said hollow torch body to pass to said port via said passage, and
    l. at least one of said core and said heat-sink block having an extended surface area over which said inert shielding gas flows from said inlet means to said port.

2. A torch according to claim 1 in which said heat-sink block has a finned surface and said inert gas flows over said finned surface from said inlet means to said port.

3. A torch according to claim 2 in which said heat-sink block has annular fins.

4. A torch according to claim 3 further comprising passages through said annular fins through which said inert gas flows from said inlet means to said port.

5. A torch according to claim 1 in which said heat-sink block is of copper.

6. A torch according to claim 1 in which said core of high heat conductivity has an extended surface area provided by fins between which and the hollow stem said inert gas flows from said inlet means to said port.

7. A torch according to claim 1 in which said core of high heat conductivity has an extended surface area provided by splines extending axially along its length between which and the hollow stem said inert gas flows from said inlet means to said port.

8. A torch according to claim 1 in which said core of high heat conductivity is of copper.

* * * * *